(12) United States Patent
Zhang et al.

(10) Patent No.: US 10,104,215 B2
(45) Date of Patent: Oct. 16, 2018

(54) BLACKLIST MANAGEMENT METHOD AND DEVICE

(71) Applicant: Huawei Technologies Co., Ltd., Shenzhen (CN)

(72) Inventors: Wenhu Zhang, Shenzhen (CN); Faliang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/109,186

(22) PCT Filed: Apr. 16, 2014

(86) PCT No.: PCT/CN2014/075528
§ 371 (c)(1),
(2) Date: Jun. 30, 2016

(87) PCT Pub. No.: WO2015/157948
PCT Pub. Date: Oct. 22, 2015

(65) Prior Publication Data
US 2016/0330307 A1    Nov. 10, 2016

(51) Int. Cl.
*H04M 1/66* (2006.01)
*H04M 3/00* (2006.01)
(Continued)

(52) U.S. Cl.
CPC .............. *H04M 1/663* (2013.01); *H04M 1/57* (2013.01); *H04M 2250/12* (2013.01)

(58) Field of Classification Search
CPC ... H04M 1/663; H04M 3/42059; H04M 3/436
(Continued)

(56) References Cited

U.S. PATENT DOCUMENTS 9,060,057 B1 * 6/2015 Danis ................ H04M 3/42059
2006/0052109 A1   3/2006 Ashman, Jr. et al.
(Continued)

FOREIGN PATENT DOCUMENTS

CN    1848890 A    10/2006
CN    2938604 Y    8/2007
(Continued)

OTHER PUBLICATIONS

Foreign Communication From a Counterpart Application, European Application No. 14889275.5, Extended European Search Report dated Dec. 22, 2016, 8 pages.
(Continued)

*Primary Examiner* — Thjuan K Addy
(74) *Attorney, Agent, or Firm* — Conley Rose, P.C.

(57) ABSTRACT

Embodiments of the present invention provide a blacklist management method and a device, relate to the field of communications, and are used for rapidly and conveniently adding a number to a blacklist, thereby improving operation efficiency of a terminal. The method includes: detecting, by a first terminal, an acceleration of the first terminal; when it is determined that the acceleration is greater than or equal to a first preset value, acquiring identification information of a second terminal; and adding the identification information to a blacklist. Embodiments of the method are used for blacklist management.

18 Claims, 4 Drawing Sheets

(51) Int. Cl.
*H04M 3/42* (2006.01)
*H04M 1/663* (2006.01)
*H04M 1/57* (2006.01)

(58) Field of Classification Search
USPC .................. 379/199, 188, 190, 192, 210.02; 455/41.2
See application file for complete search history.

(56) References Cited

U.S. PATENT DOCUMENTS

| | | | |
|---|---|---|---|
| 2009/0304167 | A1 | 12/2009 | Wright et al. |
| 2011/0283349 | A1* | 11/2011 | Wu .................. H04M 1/663 726/11 |
| 2013/0171935 | A1* | 7/2013 | Tsai .................. H04W 12/04 455/41.2 |
| 2014/0101621 | A1 | 4/2014 | Zhu et al. |

FOREIGN PATENT DOCUMENTS

| | | |
|---|---|---|
| CN | 101022621 A | 8/2007 |
| CN | 101076048 A | 11/2007 |
| CN | 201063674 Y | 5/2008 |
| CN | 101252723 A | 8/2008 |
| CN | 101291362 A | 10/2008 |
| CN | 101335940 A | 12/2008 |
| CN | 101494677 A | 7/2009 |
| CN | 101552955 A | 10/2009 |
| CN | 101577770 A | 11/2009 |
| CN | 101635885 A | 1/2010 |
| CN | 101753725 A | 6/2010 |
| CN | 101923766 A | 12/2010 |
| CN | 102521971 A | 6/2012 |
| CN | 102547683 A | 7/2012 |
| CN | 102572058 A | 7/2012 |
| CN | 102572117 A | 7/2012 |
| CN | 102594966 A | 7/2012 |
| CN | 102722426 A | 10/2012 |
| CN | 102868828 A | 1/2013 |
| CN | 103092341 A | 5/2013 |
| CN | 103118202 A | 5/2013 |
| CN | 103152488 A | 6/2013 |
| CN | 103312885 A | 9/2013 |
| CN | 103324482 A | 9/2013 |
| CN | 103685712 A | 3/2014 |
| JP | 2009224928 A | 10/2009 |
| KR | 20030040949 A | 5/2003 |
| KR | 20050097112 A | 10/2005 |

OTHER PUBLICATIONS

Partial English Translation and Abstract of Chinese Patent Application No. CN103118202, Jun. 29, 2016, 2 pages.
Partial English Translation and Abstract of Chinese Patent Application No. CN103312885, Jun. 29, 2016, 8 pages.
Partial English Translation and Abstract of Chinese Patent Application No. CN1848890, Oct. 18, 2006, 3 pages.
Partial English Translation and Abstract of Chinese Patent Application No. CN2938604, Aug. 22, 2007, 15 pages.
Partial English Translation and Abstract of Chinese Patent Application No. CN101076048, Nov. 21, 2007, 4 pages.
Partial English Translation and Abstract of Chinese Patent Application No. CN101252723, Aug. 27, 2008, 4 pages.
Partial English Translation and Abstract of Chinese Patent Application No. CN101335940, Dec. 31, 2008, 3 pages.
Partial English Translation and Abstract of Chinese Patent Application No. CN101494677, Jul. 29, 2009, 4 pages.
Partial English Translation and Abstract of Chinese Patent Application No. CN101552955, Oct. 7, 2009, 4 pages.
Partial English Translation and Abstract of Chinese Patent Application No. CN101635885, Jan. 27, 2010, 3 pages.
Partial English Translation and Abstract of Chinese Patent Application No. CN101753725, Jun. 23, 2010, 16 pages.
Partial English Translation and Abstract of Chinese Patent Application No. CN101923766, Dec. 22, 2010, 5 pages.
Partial English Translation and Abstract of Chinese Patent Application No. CN102521971, Jun. 27, 2012, 5 pages.
Partial English Translation and Abstract of Chinese Patent Application No. CN102547683, Jul. 4, 2012, 15 pages.
Partial English Translation and Abstract of Chinese Patent Application No. CN102572058, Jul. 11, 2012, 7 pages.
Partial English Translation and Abstract of Chinese Patent Application No. CN102572117, Jul. 11, 2012, 6 pages.
Partial English Translation and Abstract of Chinese Patent Application No. CN102594966, Jul. 18, 2012, 10 pages.
Partial English Translation and Abstract of Chinese Patent Application No. CN102722426, Oct. 10, 2012, 4 pages.
Partial English Translation and Abstract of Chinese Patent Application No. CN103152488, Jun. 12, 2013, 4 pages.
Partial English Translation and Abstract of Chinese Patent Application No. CN103324482, Sep. 25, 2013, 9 pages.
Partial English Translation and Abstract of Chinese Patent Application No. CN201063674, May 21, 2008, 8 pages.
Foreign Communication From a Counterpart Application, Chinese Application No. 201480001357.X, Chinese Office Action dated Sep. 25, 2015, 6 pages.
Foreign Communication From a Counterpart Application, Chinese Application No. 201480001357.X, Chinese Office Action dated May 11, 2016, 4 pages.
Foreign Communication From a Counterpart Application, Chinese Application No. 201480001357.X, Chinese Office Action dated Sep. 21, 2016, 4 pages.
Foreign Communication From a Counterpart Application, PCT Application No. PCT/CN2014/075528, English Translation of International Search Report dated Jan. 9, 2015, 3 pages.
Foreign Communication From a Counterpart Application, PCT Application No. PCT/CN2014/075528, English Translation of Written Opinion dated Jan. 9, 2015, 12 pages.
Machine Translation and Abstract of Japanese Publication No. JP2009224928, Oct. 1, 2009, 26 pages.
Machine Translation and Abstract of Korean Publication No. KR20050097112, Part 1, Oct. 7, 2005, 4 pages.
Machine Translation and Abstract of Korean Publication No. KR20050097112, Part 2, Oct. 7, 2005, 3 pages.
Machine Translation and Abstract of Korean Publication No. KR20030040949, Part 1, May 23, 2003, 8 pages.
Machine Translation and Abstract of Korean Publication No. KR20030040949, Part 2, May 23, 2003, 3 pages.
Foreign Communication From a Counterpart Application, Korean Application No. 10-2016-7017976, Korean Office Action dated Mar. 28, 2017, 6 pages.
Foreign Communication From a Counterpart Application, Korean Application No. 10-2016-7017976, English Translation of Korean Office Action dated Mar. 28, 2017, 3 pages.

* cited by examiner

BLACKLIST MANAGEMENT METHOD AND DEVICE

CROSS-REFERENCE TO RELATED APPLICATIONS

This application is a national stage application of international application number PCT/CN2014/075528 filed on Apr. 16, 2014, which is incorporated by reference.

TECHNICAL FIELD

The present disclosure relates to the field of communications, and in particular, to a blacklist management method and a device.

BACKGROUND

Nowadays, with the rapid development of information technologies, the issue of information security becomes increasingly important. However, the issue of information security is a critical issue that currently exists, while extensive coverage of networks makes information leakage more common. For a user of a mobile terminal, with leakage of personal information, nuisance calls also make the user suffer greatly. Therefore, the user generally adds a number of which a call is to be rejected to a blacklist to resist a communication request initiated from the number.

In some approaches, the user opens a communication record of the terminal, selects, from the communication record, a number of which a call is to be rejected, clicks the number and opens a corresponding menu, and adds the number to a blacklist by clicking and selecting a corresponding option in the menu. After the number is added to the blacklist, if a communication request initiated from the number is received again, the terminal automatically rejects the communication request according to the blacklist, to ensure that the user is no longer harassed by the number.

However, in some approaches, a user needs to open a communication record and select a number of which a call needs to be rejected, and then open a menu and select a corresponding option to add the number to a blacklist. In this way, steps in an operation process of adding a number of which a call is to be rejected to a blacklist are complex, resulting in inconvenience.

SUMMARY

Embodiments of the present disclosure provide a blacklist management method and a device, to implement that a number is rapidly and conveniently added to a blacklist, thereby improving operation efficiency of a terminal.

To achieve the foregoing objective, in the embodiments of the present disclosure, the following technical solutions are used:

According to a first aspect, a blacklist management method is provided, including: detecting, by a first terminal, an acceleration of the first terminal; when it is determined that the acceleration is greater than or equal to a first preset value, acquiring identification information of a second terminal, where the second terminal is a terminal that communicates with the first terminal; and adding the identification information to a blacklist.

With reference to the first aspect, in a first possible implementation manner of the first aspect, the acquiring identification information of the second terminal includes: when it is determined that the first terminal is in a call with the second terminal, acquiring the identification information of the second terminal; and before the adding the identification information to a blacklist, the method further includes: terminating the call from the second terminal corresponding to the identification information.

With reference to the first aspect, in a second possible implementation manner of the first aspect, before the acquiring identification information of the second terminal, the method further includes: when it is determined that the first terminal is not in a call and a communication application of the first terminal is in the background, determining a first call, whose call end time point is closest to a current time point, among all calls of the first terminal, and determining a first time segment according to the call end time point of the first call and the current time point; and the acquiring identification information of a second terminal includes: when it is determined that the first time segment is less than a second preset value, acquiring the identification information of the second terminal corresponding to the first call.

With reference to any one of the first aspect to the second possible implementation manner of the first aspect, in a third possible implementation manner of the first aspect, before the detecting, by a first terminal, an acceleration of the first terminal, the method further includes: receiving a call request sent by the second terminal, and determining the identification information of the second terminal according to the call request; the detecting, by a first terminal, an acceleration of the first terminal includes: after it is determined that the blacklist does not include the identification information of the second terminal, detecting the acceleration of the first terminal; and during the detecting an acceleration of the first terminal, the method further includes: when a first preset time segment after a call corresponding to the call request is ended is reached, stopping detection of the acceleration of the first terminal.

With reference to the first aspect, in a fourth possible implementation manner of the first aspect, the acquiring identification information of the second terminal includes: when it is determined that a communication message, for communication with the second terminal, in a communication application of the first terminal is in the foreground, acquiring the identification information of the second terminal.

With reference to the fourth possible implementation manner of the first aspect, in a fifth possible implementation manner of the first aspect, the detecting, by a first terminal, an acceleration of the first terminal includes: after a communication message selection instruction triggered by a user operation is acquired, detecting the acceleration of the first terminal; and during the detecting an acceleration of the first terminal, the method further includes: when a second preset time segment after the communication message selection instruction triggered by the user operation is received is reached, stopping detection of the acceleration of the first terminal.

According to a second aspect, a terminal is provided, including: a detection unit configured to detect an acceleration of the terminal; an acquiring unit configured to: when it is determined that the acceleration detected by the detection unit is greater than or equal to a first preset value, acquire identification information of a second terminal, where the second terminal is a terminal that communicates with the terminal; and a processing unit configured to add the identification information acquired by the acquiring unit to a blacklist.

With reference to the second aspect, in a first possible implementation manner of the second aspect, the acquiring unit is further configured to: when it is determined that the terminal is in a call with the second terminal, acquire the identification information of the second terminal; and the processing unit is further configured to: before the identification information is added to the blacklist, terminate the call from the second terminal corresponding to the identification information.

With reference to the second aspect, in a second possible implementation manner of the second aspect, the processing unit is further configured to: before the acquiring unit acquires the identification information of the second terminal, when it is determined that the terminal is not in a call and a communication application of the terminal is in the background, determine a first call, whose call end time point is closest to a current time point, among all calls of the terminal, and determine a first time segment according to the call end time point of the first call and the current time point; and the acquiring unit is further configured to: when it is determined that the first time segment is less than a second preset value, acquire the identification information of the second terminal corresponding to the first call.

With reference to any one of the second aspect to the second possible implementation manner of the second aspect, in a third possible implementation manner of the second aspect, the acquiring unit is further configured to: before the detection unit detects the acceleration of the terminal, receive a call request sent by the second terminal, and determine the identification information of the second terminal according to the call request; and the detection unit is further configured to: after it is determined that the blacklist does not include the identification information of the second terminal, detect the acceleration of the terminal, and when a first preset time segment after a call corresponding to the call request is ended is reached, stop detection of the acceleration of the terminal.

With reference to the second aspect, in a fourth possible implementation manner of the second aspect, the acquiring unit is further configured to: when it is determined that a communication message, for communication with the second terminal, in a communication application of the terminal is in the foreground, acquire the identification information of the second terminal.

With reference to the fourth possible implementation manner of the second aspect, in a fifth possible implementation manner of the second aspect, the acquiring unit is further configured to acquire a communication message selection instruction triggered by a user operation; and the detection unit is specifically configured to: after the acquiring unit acquires the communication message selection instruction triggered by the user operation, detect the acceleration of the terminal, and when a second preset time segment after the communication message selection instruction triggered by the user operation is received is reached, stop detection of the acceleration of the terminal. The detection unit is further configured to: after the acquiring unit receives the communication message selection instruction triggered by the user operation, detect the acceleration of the terminal, and when a second preset time segment after the communication message selection instruction triggered by the user operation is received is reached, stop detection of the acceleration of the terminal.

According to a third aspect, a terminal is provided, including: a processor and a memory, where the memory stores a computer executable instruction, and the processor is connected to the memory by using a communications bus; and when the terminal runs, the processor detects an acceleration of the terminal, and when it is determined that the acceleration is greater than or equal to a first preset value, acquires identification information of a second terminal, and adds the identification information to a blacklist; where the second terminal is a terminal that communicates with the terminal.

With reference to the third aspect, in a first possible implementation manner of the third aspect, the processor is further configured to: when it is determined that the terminal is in a call with the second terminal, acquire the identification information of the second terminal, and terminate the call from the second terminal corresponding to the identification information.

With reference to the third aspect, in a second possible implementation manner of the third aspect, the processor is further configured to: before the acquiring the identification information of the second terminal, when it is determined that the terminal is not in a call and a communication application of the terminal is in the background, determine a first call, whose call end time point is closest to a current time point, among all calls of the terminal, and determine a first time segment according to the call end time point of the first call and the current time point; and when it is determined that the first time segment is less than or equal to a second preset value, acquire the identification information of the second terminal corresponding to the first call.

With reference to the third aspect to the second possible implementation manner of the third aspect, in a third possible implementation manner of the third aspect, the processor is further configured to: before the terminal detects the acceleration of the terminal, receive a call request sent by the second terminal, and determine the identification information of the second terminal according to the call request; and after it is determined that the blacklist does not include the identification information of the second terminal, detect the acceleration of the terminal, and when a first preset time segment after a call corresponding to the call request is ended is reached, stop detection of the acceleration of the terminal.

With reference to the third aspect, in a fourth possible implementation manner of the third aspect, the processor is further configured to: when it is determined that a communication message, for communication with the second terminal, in a communication application of the terminal is in the foreground, acquire the identification information of the second terminal.

With reference to the fourth possible implementation manner of the third aspect, in a fifth possible implementation manner of the third aspect, the processor is further configured to: after acquiring a communication message selection instruction triggered by a user operation, detect the acceleration of the terminal, and when a second preset time segment after the communication message selection instruction triggered by the user operation is received is reached, stop detection of the acceleration of the terminal.

By using the foregoing technical solutions, a first terminal detects an acceleration of the first terminal; when it is determined that the acceleration is greater than or equal to a first preset value, acquires identification information of a second terminal; and adds the identification information to a blacklist. In this way, a first terminal can automatically add, to a blacklist according to an acceleration of the first terminal, a number that needs to be blacklisted by a user. A user can complete an operation of addition on a blacklist simply by rapidly shaking a terminal once, so that a number can be rapidly and conveniently added to the blacklist, thereby improving operation efficiency of the terminal.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
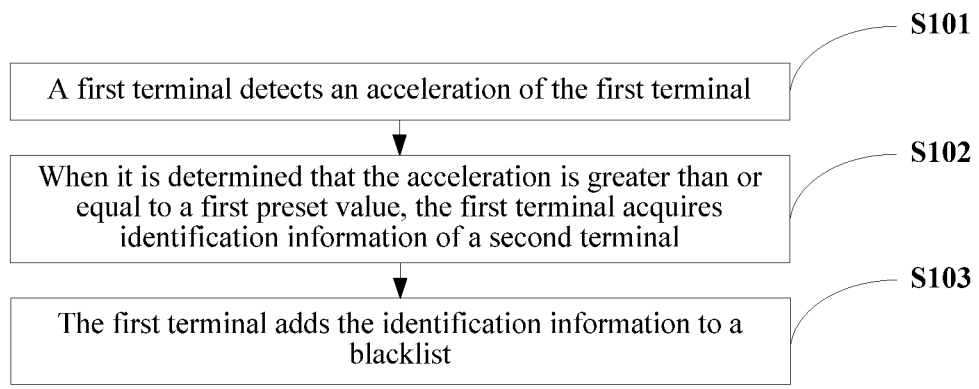
FIG. 1 is a schematic flowchart of a blacklist management method according to an embodiment of the present disclosure.

An embodiment of the present disclosure provides a blacklist management method. As shown in FIG. 1, the method is executed by a first terminal, and the method includes:

S101: A first terminal detects an acceleration of the first terminal.

Specifically, the first terminal detects the acceleration of the first terminal in the following two implementation manners:

Manner 1: Before the first terminal detects the acceleration of the first terminal, the first terminal receives a call request sent by the second terminal, and determines identification information of the second terminal according to the call request. After it is determined that the blacklist does not include the identification information of the second terminal, the first terminal detects the acceleration of the first terminal.

Specifically, after receiving the call request sent by the second terminal, the first terminal determines the identification information of the second terminal according to the call request sent by the second terminal, and when it is determined that the identification information of the second terminal is not in the blacklist of the first terminal, begins to detect the acceleration of the first terminal.

Exemplarily, the first terminal may be a mobile phone 1, and the second terminal may be a mobile phone 2. After the mobile phone 1 receives a telephone call from the mobile phone 2, when the mobile phone 1 determines that identification information of the mobile phone 2 is not in a blacklist, the mobile phone 1 turns on an acceleration sensor to detect an acceleration of the mobile phone 1.

Further, when a first preset time segment after a call corresponding to the call request is ended is reached, detection of the acceleration of the first terminal is stopped.

Specifically, if the first preset time segment is 30 seconds, when 30 seconds elapse after the call is ended according to a user operation, the first terminal stops the detection of the acceleration of the first terminal.

Manner 2: After receiving a communication message selection instruction triggered by a user operation, the first terminal detects the acceleration of the first terminal.

Specifically, the first terminal may be a mobile phone 1, the second terminal may be a mobile phone 2, and a communication application may be a short message service application. After receiving a communication message selection instruction triggered by a user operation, the mobile phone 1 enables the short message service application to enter the foreground, opens a short message service message corresponding to the communication message selection instruction, and at the same time turns on an acceleration sensor to detect an acceleration of the mobile phone 1. The communication application may be a built-in short message service application of the terminal, or may be instant messaging software installed on the terminal. A communication message may be a short message service message, or may be an interaction message in the instant messaging software. For this, this is not limited in this embodiment of the present disclosure.

Further, when a second preset time segment after the communication message selection instruction triggered by the user operation is received is reached, the detection of the acceleration of the first terminal is stopped.

Specifically, the first terminal may be a mobile phone 1, the second terminal may be a mobile phone 2, and the communication application may be a short message service application. If the second preset time segment is 60 seconds, after receiving a communication message selection instruction triggered by a user operation, the mobile phone 1 enables the short message service application to enter the foreground, opens a short message service message corresponding to the communication message selection instruction, and at the same time turns on an acceleration sensor to detect an acceleration of the mobile phone 1. When 60 seconds elapse after the communication message selection instruction triggered by the user operation is received, the mobile phone 1 stops detection of the acceleration of the mobile phone 1.

S102: When it is determined that the acceleration is greater than or equal to a first preset value, the first terminal acquires identification information of a second terminal.

The second terminal is a terminal that communicates with the first terminal.

Specifically, in a possible implementation manner of this embodiment of the present disclosure, when it is determined that the first terminal is in a call with the second terminal, the identification information of the second terminal is acquired.

Exemplarily, the first terminal may be a mobile phone 1, and the second terminal may be a mobile phone 2. When the mobile phone 1 detects that an acceleration of the mobile phone 1 is greater than or equal to a first preset value, if it is determined that the mobile phone 1 is in a call, the mobile phone 1 acquires identification information of the mobile phone 2 that is in a call with the mobile phone 1. The identification information may be an international mobile subscriber identity (IMSI) of the mobile phone 2, where the IMSI is an electronic serial number that consists of no more than 15 digits, and is an identifier for uniquely identifying each subscriber identity module (SIM) card.

Optionally, in another possible implementation manner of this embodiment of the present disclosure, when it is determined that the first terminal is not in a call and a communication application of the first terminal is in the background, a first call, whose call end time point is closest to a current time point, among all calls of the first terminal is determined, and a first time segment is determined according to the call end time point of the first call and the current time point; and when it is determined that the first time segment is less than a second preset value, the identification information of the second terminal corresponding to the first call is acquired.

Specifically, when the first terminal detects that the acceleration of the first terminal is greater than or equal to the first preset value, if it is determined that the first terminal is not in a call and the communication application of the first terminal is in the background, the first terminal determines, according to a call record of the first terminal, the first call, whose call end time point is closest to the current time point, among all calls, and determines the first time segment according to the call end time point of the first call and the current time point; and when it is determined that the first time segment is less than the second preset value, acquires the identification information of the second terminal corresponding to the first call.

Exemplarily, the first terminal may be a mobile phone 1, the second terminal may be a mobile phone 2, and the second preset value may be 30 seconds. After ending a call, a user needs to add the mobile phone 2, that is, the other party of the call, to a blacklist. The user shakes the mobile phone, and then the mobile phone 1 detects that an acceleration of the mobile phone 1 is greater than or equal to a first preset value, and determines that the mobile phone 1 is not in a call and a communication application of the mobile phone 1 is in the background. The mobile phone 1 can then determine, according to a call record of the mobile phone 1, a first call (that is, the call with the mobile phone 2), whose call end time is closest to a current time, among all calls, and if a period from a time when the first call ends to the current time is not longer than 30 seconds, determine identification information of the mobile phone 2.

Optionally, in still another possible implementation manner of this embodiment of the present disclosure, when it is determined that a communication message, for communication with the second terminal, in a communication application of the first terminal is in the foreground, the identification information of the second terminal is acquired.

Specifically, when the first terminal detects that the acceleration of the first terminal is greater than or equal to the first preset value, if it is determined that the communication application of the first terminal is in the foreground, the first terminal acquires the identification information of the second terminal corresponding to the communication application.

Exemplarily, the first terminal may be a mobile phone 1, the second terminal may be a mobile phone 2, and the communication application may be a short message service application. When reading a short message service message sent by the mobile phone 2, a user of the mobile phone 1 determines to add the mobile phone 2 to a blacklist, and the user shakes the mobile phone. The mobile phone 1 then detects that an acceleration of the mobile phone 1 is greater than or equal to a first preset value, and determines that the short message service application of the mobile phone 1 is in the foreground, and then the mobile phone 1 acquires identification information of the mobile phone 2 corresponding to the short message service message.

It should be noted that, before the first terminal adds the identification information to the blacklist, the identification information, of the second terminal, acquired by the first terminal may be identification information, of the second terminal, acquired when the first terminal invokes, from inside, a received communication request of the second terminal, or may be identification information, of the second terminal, acquired by the first terminal again according to a communication record, which is not limited in this embodiment of the present disclosure.

S103: The first terminal adds the identification information to a blacklist.

Specifically, after acquiring the identification information of the second terminal, the first terminal adds the identification information of the second terminal to the blacklist, and then when the first terminal receives again a communication request sent by the second terminal, the first terminal rejects the communication request of the second terminal according to the blacklist.

Optionally, if it is determined that the first terminal is in a call with the second terminal, after the identification information of the second terminal is acquired, a call from the second terminal corresponding to the identification information is terminated, and the identification information is added to the blacklist.

Exemplarily, the first terminal may be a mobile phone 1, and the second terminal may be a mobile phone 2. If a user shakes the mobile phone 1 during a call, and the mobile phone 1 detects that an acceleration is greater than or equal to a first preset value, after acquiring identification information of the mobile phone 2 corresponding to the call, the first terminal terminates the current call, and adds the identification information of the mobile phone 2 to a blacklist.

Further, after the first terminal adds the identification information of the mobile phone to the blacklist, if the first terminal receives again a communication request sent by the second terminal, the first terminal rejects the communication request of the second terminal according to the blacklist.

Exemplarily, the first terminal may be a mobile phone 1, and the second terminal may be a mobile phone 2. After the mobile phone 1 adds identification information of the mobile phone 2 to a blacklist, if the mobile phone 2 calls the mobile phone 1 again, the mobile phone 1 checks the blacklist of the mobile phone 1 after receiving a call request sent by the mobile phone 2, and when it is determined that the blacklist includes the identification information of the mobile phone 2, ends the call from the mobile phone 2.

By using the foregoing technical solution, a first terminal detects an acceleration of the first terminal; when it is determined that the acceleration is greater than or equal to a first preset value, acquires identification information of a second terminal; and adds the identification information to a blacklist. In this way, a first terminal can automatically add, to a blacklist according to an acceleration of the first terminal, a number that needs to be blacklisted by a user. A user can complete an operation of addition on a blacklist simply by rapidly shaking a terminal once, so that a number can be rapidly and conveniently added to the blacklist, thereby improving operation efficiency of the terminal.

Figure 2:
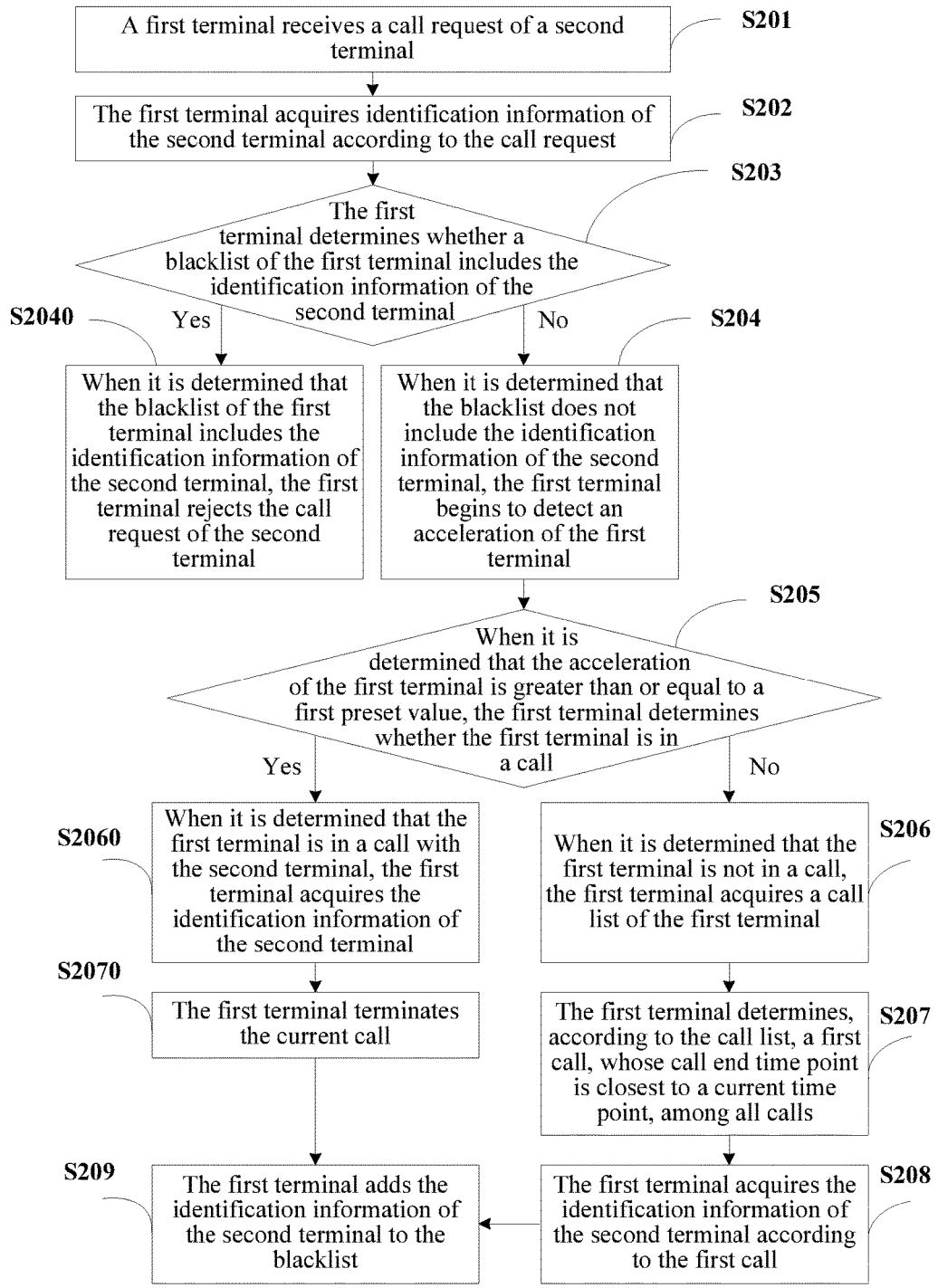
FIG. 2 is a schematic flowchart of another blacklist management method according to embodiment of the present disclosure.

An embodiment of the present disclosure provides a blacklist management method. As shown in FIG. 2, in this embodiment of the present disclosure, the first terminal and the second terminal implement communication by using a call. The method includes:

S201: A first terminal receives a call request of a second terminal.

S202: The first terminal acquires identification information of the second terminal according to the call request.

Exemplarily, the first terminal may be a mobile phone 1, the second terminal may be a mobile phone 2, and the call request may be an incoming call from the mobile phone 2. After receiving the incoming call from the mobile phone 2, the mobile phone 1 determines identification information (for example, a phone number) of the mobile phone 2.

S203: The first terminal determines whether a blacklist of the first terminal includes the identification information of the second terminal.

Specifically, before the first terminal detects an acceleration of the first terminal, the first terminal receives the call request sent by the second terminal, determines the identification information of the second terminal according to the call request, and determines, according to the identification information of the second terminal, whether the blacklist of the first terminal includes the identification information of the second terminal.

Further, when it is determined that the blacklist of the first terminal includes the identification information of the second terminal, the first terminal performs the following step S2040.

S2040: When it is determined that the blacklist of the first terminal includes the identification information of the second terminal, the first terminal rejects the call request of the second terminal.

Specifically, when it is determined that the blacklist of the first terminal includes the identification information of the second terminal, the first terminal does not notify a user of the incoming call and directly rejects the call request.

Optionally, when it is determined that the blacklist does not include the identification information of the second terminal, the first terminal performs the following steps S204 to S209.

S204: When it is determined that the blacklist does not include the identification information of the second terminal, the first terminal begins to detect an acceleration of the first terminal.

Specifically, when it is determined that the blacklist does not include the identification information of the second terminal, the first terminal registers an acceleration sensor monitoring event, and turns on an acceleration sensor of the first terminal to detect the acceleration of the first terminal.

Further, after the first terminal terminates the call corresponding to the call request, when a first preset time segment is reached, the first terminal stops detection of the acceleration of the first terminal.

Exemplarily, the first terminal may be a mobile phone 1, and the first preset time segment may be 30 seconds. When 30 seconds elapse after the mobile phone 1 terminates a call corresponding to a call request, the mobile phone 1 cancels an acceleration sensor monitoring event, and stops detection of the acceleration of the mobile phone 1.

S205: When it is determined that the acceleration of the first terminal is greater than or equal to a first preset value, the first terminal determines whether the first terminal is in a call.

Specifically, when determining that the identification information of the second terminal that communicates with the first terminal needs to be added to the blacklist, the user rocks or shakes the first terminal. When detecting that the acceleration of the first terminal is greater than or equal to the first preset value, the first terminal determines to add the identification information of the second terminal that communicates with the first terminal to the blacklist, and then the first terminal determines whether the first terminal is in a call.

Further, if it is determined that the first terminal is in a call, the following steps S2060 to S2070 are performed.

S2060: When it is determined that the first terminal is in a call with the second terminal, the first terminal acquires the identification information of the second terminal.

Specifically, when it is determined that the acceleration of the first terminal is greater than or equal to the first preset value, if it is determined that the first terminal is in a call with the second terminal, the first terminal determines the identification information of the second terminal according to the call.

It should be noted that, before the first terminal adds the identification information to the blacklist, the identification information, of the second terminal, acquired by the first terminal may be identification information, of the second terminal, acquired when the first terminal invokes, from inside, a received communication request of the second terminal, or may be identification information, of the second terminal, acquired by the first terminal again according to a communication record, which is not limited in this embodiment of the present disclosure.

S2070: The first terminal terminates the current call.

Specifically, after acquiring the identification information of the second terminal, the first terminal terminates the call from the second terminal corresponding to the identification information.

Exemplarily, the first terminal may be a mobile phone 1, and the second terminal may be a mobile phone 2. If determining, in a process of answering an incoming call, to blacklist the mobile phone 2 corresponding to the current call, a user shakes or rocks the mobile phone. When the mobile phone 1 detects that an acceleration of the mobile phone 1 is greater than or equal to a first preset value, and determines that the mobile phone 1 is in a call, the mobile phone 1 terminates the current call before adding identification information of the mobile phone 2 to a blacklist.

Optionally, if it is determined that the first terminal is not in a call, the first terminal performs the following steps S206 to S208.

S206: When it is determined that the first terminal is not in a call, the first terminal acquires a call list of the first terminal.

Specifically, after the user ends the call, the first terminal detects that the acceleration of the first terminal is greater than or equal to the first preset value, and determines that the first terminal is not in a call, and then the first terminal acquires the call list of the first terminal.

S207: The first terminal determines, according to the call list, a first call, whose call end time point is closest to a current time point, among all calls, and determines a first time segment according to the call end time point of the first call and the current time point.

Specifically, when it is determined that the acceleration of the first terminal is greater than or equal to the first preset value, if it is determined that the first terminal is not in a call, the first terminal acquires the call list of the first terminal, obtains all calls of the first terminal according to the call list, determines the first call, whose call end time point is closest to the current time point, among all the calls, and determines the first time segment from the end time point of the first call to the current time point.

S208: When it is determined that the first time segment is less than or equal to a second preset value, the first terminal acquires the identification information of the second terminal according to the first call.

Specifically, after the first call is determined, if the first time segment is less than or equal to the second preset value, the first terminal may acquire the identification information of the second terminal according to the first call.

Exemplarily, the first terminal may be a mobile phone 1, the second terminal may be a mobile phone 2, the identification information may be a phone number, and the second preset value may be 30 seconds. After answering an incoming call, and ending the incoming call, if a user determines to blacklist a phone number of the mobile phone 2 corresponding to the call, the user shakes or rocks the mobile phone 1. When detecting an acceleration greater than or equal to a first preset value, and determining that the mobile phone 1 is not in a call, the mobile phone 1 acquires a call record of the mobile phone 1, and determines, according to the call record, a first call that is among all calls and whose call end time is closest to a current time (where the first call may be the first in the call record that is sorted according to a reversed time sequence). When it is determined that a period from a time when the first call ends to the current time is no longer than 30 seconds, the mobile phone 1 obtains the phone number of the second terminal corresponding to the first call according to the call record.

S209: The first terminal adds the identification information of the second terminal to the blacklist.

Specifically, the second terminal may be the mobile phone 2, and the identification information may be a phone number of the mobile phone 2, where the phone number is an IMSI of the mobile phone 2, and the IMSI is an electronic serial number that consists of no more than 15 digits, and is an identifier for uniquely identifying each SIM card. After the first terminal adds the IMSI of the second terminal to the blacklist, if the first terminal receives a call request of the second terminal again, the first terminal rejects the call request of the second terminal according to the blacklist.

By using the foregoing technical solution, a first terminal detects an acceleration of the first terminal; when it is determined that the acceleration is greater than or equal to a first preset value, acquires identification information of a second terminal; and adds the identification information to a blacklist. In this way, a first terminal can automatically add, to a blacklist according to an acceleration of the first terminal, a number that needs to be blacklisted by a user. A user can complete an operation of addition on a blacklist simply by rapidly shaking a terminal once, so that a number can be rapidly and conveniently added to the blacklist, thereby improving operation efficiency of the terminal.

It should be noted that, for the foregoing method embodiments, for a purpose of simple description, each method embodiment is described as a combination of a series of actions. However, a person skilled in the art should know that the present disclosure is not limited to the described action sequence. Secondly, the person skilled in the art should also know that, all the embodiments described in the specification are exemplary embodiments, and the involved actions and modules are not necessarily essential in the present disclosure.

Figure 3:
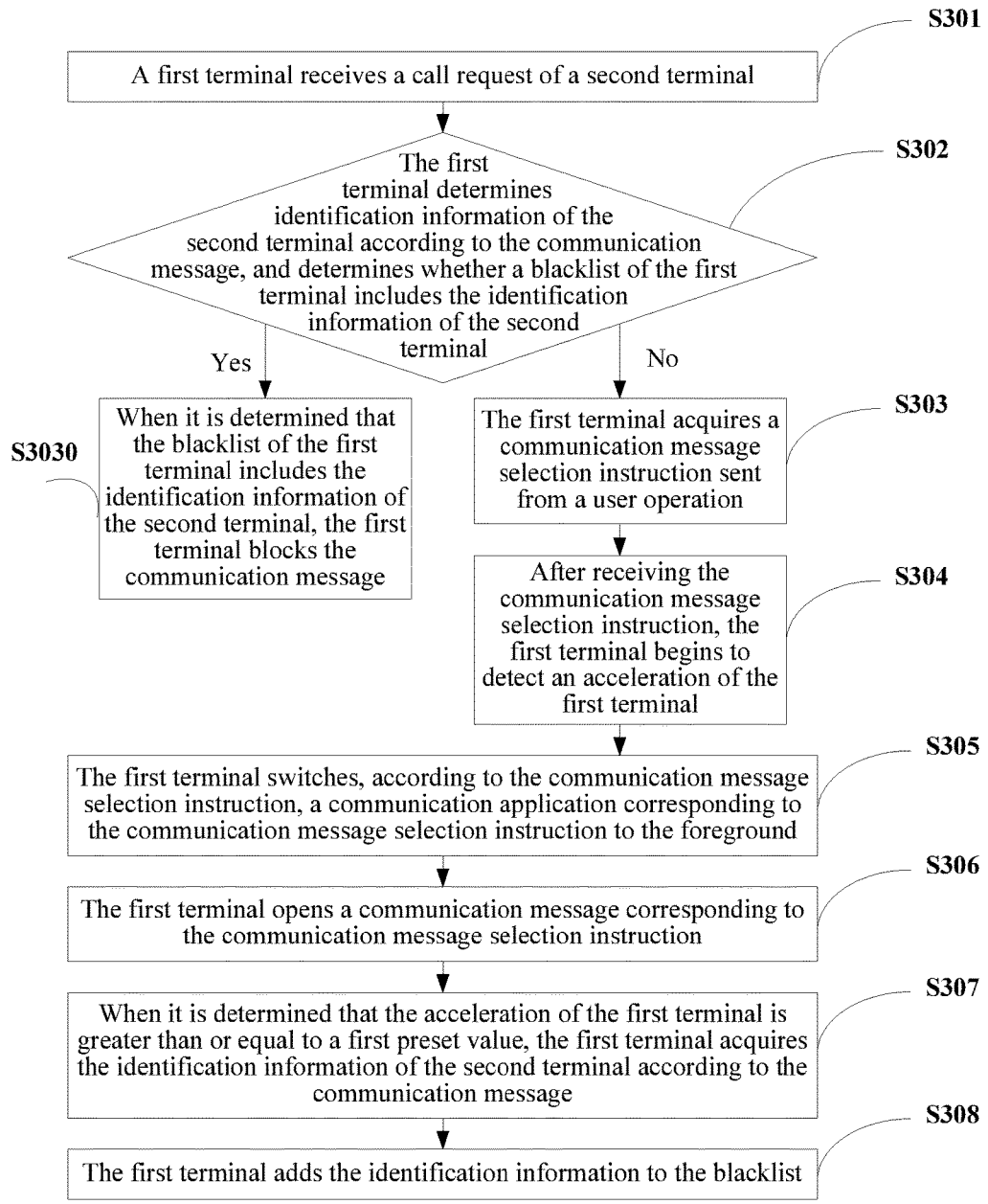
FIG. 3 is a schematic flowchart of another blacklist management method according to embodiment of the present disclosure.

An embodiment of the present disclosure provides a blacklist management method. As shown in FIG. 3, in this embodiment of the present disclosure, the first terminal and the second terminal implement communication by using a communication application. The method includes:

S301: A first terminal receives a communication message sent by a second terminal.

Specifically, after the second terminal sends the communication message to the first terminal, the first terminal receives the communication message.

S302: The first terminal determines identification information of the second terminal according to the communication message, and determines whether a blacklist of the first terminal includes the identification information of the second terminal.

Specifically, after receiving the communication message sent by the second terminal, the first terminal determines the identification information of the second terminal according to the communication message, and determines whether the blacklist of the first terminal includes the identification information of the second terminal. If the blacklist of the first terminal includes the identification information of the second terminal, the following step S3030 is performed.

S3030: When it is determined that the blacklist of the first terminal includes the identification information of the second terminal, the first terminal blocks the communication message.

Specifically, the first terminal may add the communication message to a blocking list, and delete the communication message from a communication list corresponding to the communication application.

Exemplarily, the first terminal may be a mobile phone 1, the second terminal may be a mobile phone 2, the communication application may be a short message service application, the communication message may be a short message service message, and the identification information may be a phone number. After the mobile phone 1 receives a short message service message sent by the mobile phone 2, if it is determined that a blacklist includes a phone number of the mobile phone 2, the mobile phone 1 adds, to a blocking list, the short message service message sent by the mobile phone 2, and deletes the short message service message from a short message service message list.

It should be noted that, the communication application may be a built-in short message service application of the terminal, or may be instant messaging software installed on the terminal; the communication message may be a short message service message, or may be an interaction message in the instant messaging software. For this, this is not limited in this embodiment of the present disclosure.

Optionally, if the blacklist of the first terminal does not include the identification information of the second terminal, the following steps S303 to S308 are performed.

S303: The first terminal acquires a communication message selection instruction triggered by a user operation.

Specifically, the communication message selection instruction may be sent when a user clicks, selects and reads an unread short message service message after receiving a short message service message, or may be sent when a user clicks and selects a short message service message from the short message service message list.

Exemplarily, the first terminal may be a mobile phone 1. When receiving a short message service message sent by a mobile phone 2, the mobile phone 1 reminds a user that the mobile phone 1 has received a new short message service message; when the user clicks, selects and reads the unread short message service message by means of operations, a communication message selection instruction is triggered; the mobile phone 1 may acquire the communication message selection instruction; in addition, after the user opens a short message service application, when the user selects the unread short message service message from a short message service application list, the communication message selection instruction may also be triggered, which is not limited in this embodiment of the present disclosure.

S304: After receiving the communication message selection instruction, the first terminal begins to detect an acceleration of the first terminal.

Specifically, after receiving the communication message selection instruction, the first terminal registers an acceleration sensor monitoring event, turns on an acceleration sensor of the first terminal, to detect the acceleration of the first terminal.

Further, after the first terminal begins to detect the acceleration of the first terminal, when a second preset time segment is reached, the first terminal stops detection of the acceleration of the first terminal.

Specifically, the first terminal may be a mobile phone 1, and the second preset time segment may be 60 seconds. After the mobile phone 1 registers the acceleration sensor monitoring event, and turns on the acceleration sensor of the first terminal, when 60 seconds elapse, the mobile phone 1 cancels the acceleration sensor monitoring event, and stops the detection of the acceleration of the mobile phone 1.

S305: The first terminal switches, according to the communication message selection instruction, a communication application corresponding to the communication message selection instruction to the foreground.

S306: The first terminal opens a communication message corresponding to the communication message selection instruction.

Specifically, the communication application may be a short message service application, and the communication message may be a short message service message. After receiving the communication message selection instruction triggered according to the user operation, the first terminal switches the short message service application to the foreground according to the communication message selection instruction, and opens the short message service message corresponding to the communication message selection instruction.

S307: When it is determined that the acceleration of the first terminal is greater than or equal to a first preset value, the first terminal acquires the identification information of the second terminal according to the communication message.

Specifically, if the first terminal detects that the acceleration of the first terminal is greater than or equal to the first preset value, when it is determined that the communication application of the first terminal is in the foreground, the first terminal obtains the communication message according to the communication application, and acquires the identification information of the second terminal according to the communication message.

Exemplarily, the first terminal may be a mobile phone 1, the second terminal may be a mobile phone 2, and the identification information may be a phone number. If after receiving a short message service message, a user clicks and reads the received short message service message, and determines, during the reading, to blacklist a phone number of the mobile phone 2 corresponding to the short message service message, the user shakes or rocks the mobile phone 1, and if the mobile phone 1 detects an acceleration greater than or equal to the first preset value, and determines that the short message service application of the mobile phone is in the foreground, the mobile phone 1 determines the short message service message according to the short message service application, and obtains the phone number of the mobile phone 2 according to the short message service message.

It should be noted that, before the first terminal adds the identification information to the blacklist, the identification information, of the second terminal, acquired by the first terminal may be identification information, of the second terminal, acquired when the first terminal invokes, from inside, a received communication request of the second terminal, or may be identification information, of the second terminal, acquired by the first terminal again according to a communication message, which is not limited in this embodiment of the present disclosure.

S308: The first terminal adds the identification information to the blacklist.

Specifically, the second terminal may be the mobile phone 2, and the identification information may be a phone number of the mobile phone 2, where the phone number is an IMSI of the mobile phone 2, and the IMSI is an electronic serial number that consists of no more than 15 digits, and is an identifier for uniquely identifying each SIM card. After the first terminal adds the IMSI of the second terminal to the blacklist, if the first terminal receives a call request of the second terminal again, the first terminal rejects the call request of the second terminal according to the blacklist.

By using the foregoing technical solution, a first terminal detects an acceleration of the first terminal; when it is determined that the acceleration is greater than or equal to a first preset value, acquires identification information of a second terminal; and adds the identification information to a blacklist. In this way, a first terminal can automatically add, to a blacklist according to an acceleration of the first terminal, a number that needs to be blacklisted by a user. A user can complete an operation of addition on a blacklist simply by rapidly shaking a terminal once, so that a number can be rapidly and conveniently added to the blacklist, thereby improving operation efficiency of the terminal.

It should be noted that, for the foregoing method embodiments, for a purpose of simple description, each method embodiment is described as a combination of a series of actions. However, a person skilled in the art should know that the present disclosure is not limited to the described action sequence. Secondly, the person skilled in the art should also know that, all the embodiments described in the specification are exemplary embodiments, and the involved actions and modules are not necessarily essential in the present disclosure.

Figure 4:
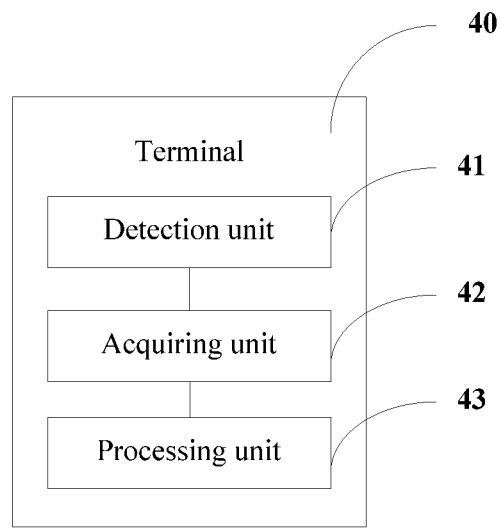
FIG. 4 is a schematic structural diagram of a terminal according to an embodiment of the present disclosure.

An embodiment of the present disclosure provides a terminal 40, and as shown in FIG. 4, the terminal 40 includes: a detection unit 41 configured to detect an acceleration of the terminal; an acquiring unit 42 configured to: when it is determined that the acceleration is greater than or equal to a first preset value, acquire identification information of a second terminal, where the second terminal is a terminal that communicates with the terminal; and a processing unit 43 configured to add the identification information obtained by the acquiring unit 42 to a blacklist.

Further, after the terminal adds the identification information of the mobile phone to the blacklist, if receiving again a communication request sent by the second terminal, the terminal rejects the communication request of the second terminal according to the blacklist.

Exemplarily, the terminal may be a mobile phone 1, and the second terminal may be a mobile phone 2. After the mobile phone 1 adds identification information of the mobile phone 2 to a blacklist, if the mobile phone 2 calls the mobile phone 1 again, the mobile phone 1 checks the blacklist of the mobile phone 1 after receiving a call request sent by the mobile phone 2, and ends the call from the mobile phone 2 when it is determined that the blacklist includes the identification information of the mobile phone 2.

Optionally, the acquiring unit 42 is further configured to: when it is determined that the terminal is in a call, acquire the identification information of the second terminal corresponding to the call.

The processing unit 43 is further configured to: before the identification information is added to the blacklist, terminate the call corresponding to the identification information.

Exemplarily, the terminal may be a mobile phone 1, and the second terminal may be a mobile phone 2. If a user shakes the mobile phone 1 during a call, the mobile phone 1 detects that an acceleration is greater than or equal to a first preset value; if it is determined that the mobile phone 1 is in a call, the mobile phone 1 acquires identification information of the mobile phone 2 that is in a call with the mobile phone 1; after acquiring the identification information of the mobile phone 2 corresponding to the call, the terminal terminates the current call, and adds the identification information of the mobile phone 2 to a blacklist.

The identification information may be an IMSI of the mobile phone 2, where the IMSI is an electronic serial number that consists of no more than 15 digits, and is an identifier for uniquely identifying each SIM card.

Optionally, the processing unit 43 is further configured to: when it is determined that the terminal is not in a call and a communication application of the terminal is in the background, determine a first call, whose call end time point is closest to a current time point, among all calls of the terminal, and determine a first time segment according to the call end time point of the first call and the current time point.

The acquiring unit 42 is further configured to: when it is determined that the first time segment is less than or equal to a second preset value, acquire the identification information of the second terminal corresponding to the first call.

Specifically, when the terminal detects that the acceleration of the terminal is greater than or equal to the first preset value, if it is determined that the terminal is not in a call and the communication application of the terminal is in the background, the terminal determines, according to a call record of the terminal, the first call, whose call end time point is closest to the current time point, among all calls, and determines the first time segment according to the call end time point of the first call and the current time point; and when it is determined that the first time segment is less than the second preset value, acquires the identification information of the second terminal corresponding to the first call.

Exemplarily, the terminal may be a mobile phone 1, the second terminal may be a mobile phone 2, and the second preset value may be 30 seconds. After ending a call, a user needs to add the mobile phone 2, that is, the other party of the call, to a blacklist. The user shakes the mobile phone, and then the mobile phone 1 detects that an acceleration of the mobile phone 1 is greater than or equal to a first preset value, and determines that the mobile phone 1 is not in a call and a communication application of the mobile phone 1 is in the background; and then the mobile phone 1 can determine, according to a call record of the mobile phone 1, a first call (that is, a call with the mobile phone 2) that is among all calls and whose call end time is closest to a current time, and determine identification information of the mobile phone 2 if a period from a time when the first call ends to the current time is no longer than 30 seconds.

Further, the acquiring unit 42 is further configured to receive a call request sent by the second terminal, and determine the identification information of the second terminal according to the call request.

The detection unit 41 is further configured to: after it is determined that the blacklist does not include the identification information of the second terminal, detect the acceleration of the terminal, and when a first preset time segment after a call corresponding to the call request is ended is reached, stop detection of the acceleration of the terminal.

Specifically, after receiving the call request sent by the second terminal, the terminal determines the identification information of the second terminal according to the call request sent by the second terminal, and when it is determined that the identification information of the second terminal is not in the blacklist of the terminal, begins to detect the acceleration of the terminal.

Exemplarily, the terminal may be a mobile phone 1, and the second terminal may be a mobile phone 2. After the mobile phone 1 receives a telephone call from the mobile phone 2, when the mobile phone 1 determines that identification information of the mobile phone 2 is not in a blacklist, the mobile phone 1 turns on an acceleration sensor to detect an acceleration of the mobile phone 1.

Further, when a first preset time segment after a call corresponding to the call request is ended is reached, detection of the acceleration of the terminal is stopped.

Specifically, if the first preset time segment is 30 seconds, when 30 seconds elapse after the call is ended according to a user operation, the terminal stops detection of the acceleration of the terminal.

It should be noted that, before the terminal adds the identification information to the blacklist, the identification information, of the second terminal, acquired by the terminal may be identification information, of the second terminal, acquired when the terminal invokes, from inside, a received communication request of the second terminal, or may be identification information, of the second terminal, acquired by the terminal again according to a communication record, which is not limited in this embodiment of the present disclosure.

Optionally, the acquiring unit 42 is further configured to: when it is determined that a communication message, for communication with the second terminal, in a communication application of the terminal is in the foreground, acquire the identification information of the second terminal.

Specifically, when the terminal detects that the acceleration of the terminal is greater than or equal to a first preset value, if it is determined that the communication application of the terminal is in the foreground, the terminal acquires the identification information of the second terminal corresponding to the communication application.

Exemplarily, the terminal may be a mobile phone 1, the second terminal may be a mobile phone 2, and the communication application may be a short message service application. When reading a short message service message sent by the mobile phone 2, a user of the mobile phone 1 determines that the mobile phone 2 needs to be added to a blacklist, and the user shakes the mobile phone; and then the mobile phone 1 detects that an acceleration of the mobile phone 1 is greater than or equal to a first preset value, and determines that the short message service application of the mobile phone 1 is in the foreground, and then the mobile phone 1 acquires identification information of the mobile phone 2 corresponding to the short message service message.

Further, the acquiring unit 42 is further configured to receive a communication message selection instruction triggered by a user operation.

The detection unit 41 is further configured to: after the acquiring unit receives the communication message selection instruction triggered by the user operation, detect the acceleration of the terminal, and when a second preset time segment after the communication message selection instruction triggered by the user operation is received is reached, stop detection of the acceleration of the terminal.

Specifically, the terminal may be a mobile phone 1, the second terminal may be a mobile phone 2, and the communication application may be a short message service application; and after receiving a communication message selection instruction triggered by a user operation, the mobile phone 1 enables the short message service application to enter the foreground, opens a short message service message corresponding to the communication message selection instruction, and at the same time turns on an acceleration sensor to detect an acceleration of the mobile phone 1. The communication application may be a built-in short message service application of the terminal, or may be instant messaging software installed on the terminal, and is not limited in this embodiment of the present disclosure.

Further, when a second preset time segment after the communication message selection instruction triggered by the user operation is received is reached, the detection of the acceleration of the terminal is stopped.

Specifically, the terminal may be a mobile phone 1, the second terminal may be a mobile phone 2, and the communication application may be a short message service application. If the second preset time segment is 60 seconds, and after receiving a communication message selection instruction triggered by a user operation, the mobile phone 1 enables the short message service application to enter the foreground, opens a short message service message corresponding to the communication message selection instruction, and at the same time turns on an acceleration sensor to detect an acceleration of the mobile phone 1. When 60 seconds elapse after receiving the communication message selection instruction triggered by the user operation, the mobile phone 1 stops detection of the acceleration of the mobile phone 1.

By using the foregoing terminal, the terminal detects an acceleration of the terminal; when it is determined that the acceleration is greater than or equal to a first preset value, acquires identification information of a second terminal; and adds the identification information to a blacklist. In this way, a terminal can automatically add, to a blacklist according to an acceleration of the terminal, a number that needs to be blacklisted by a user. A user can complete an operation of addition on a blacklist simply by rapidly shaking a terminal once, so that a number can be rapidly and conveniently added to the blacklist, thereby improving operation efficiency of the terminal.

It may be clearly understood by a person skilled in the art that, for the purpose of convenient and brief description, for a specific working process and description of the client described above, reference may be made to a corresponding process in the foregoing method embodiments, and details are not provided herein again.

Figure 5:
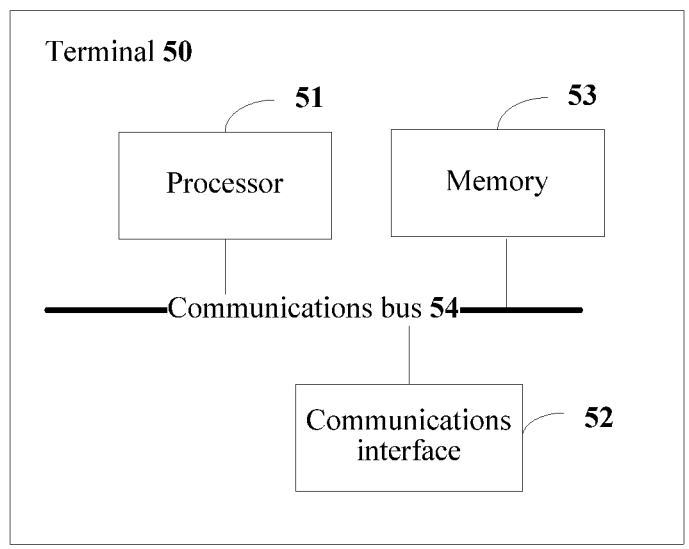
FIG. 5 is a schematic structural diagram of another terminal according to an embodiment of the present disclosure.

An embodiment of the present disclosure provides a terminal 50, and as shown in FIG. 5, the terminal includes: a processor 51, a communications interface 52, a memory 53, and a communications bus 54, where the processor 51, the communications interface 52, and the memory 53 complete communication with each other by using the communications bus 54.

The processor 51 may be a central processing unit (CPU), or may be an application-specific integrated circuit (ASIC), or may be configured as one or more integrated circuits that implement the embodiments of the present disclosure.

The memory 53 is configured to store program code, where the program code includes a computer operation instruction. The memory 53 may include a high-speed random-access memory (RAM) memory, or may further include a non-volatile memory, for example, at least one magnetic disk storage.

The communications interface 52 is configured to implement connection and communication between these apparatuses.

The processor 51 executes the program code, to detect an acceleration of the terminal, and when it is determined that the acceleration is greater than or equal to a first preset value, acquire identification information of a second terminal, and add the identification information to a blacklist.

The second terminal is a terminal that communicates with the terminal.

Optionally, the processor 51 is further configured to: when it is determined that the terminal is in a call with the second terminal, acquire the identification information of the second terminal, and terminate the call from the second terminal corresponding to the identification information.

Optionally, the processor 51 is further configured to: before the acquiring the identification information of the second terminal, when it is determined that the terminal is not in a call and a communication application of the terminal is in the background, determine a first call, whose call end time point is closest to a current time point, among all calls of the terminal, and determine a first time segment according to the call end time point of the first call and the current time point; and when it is determined that the first time segment is less than or equal to a second preset value, acquire the identification information of the second terminal corresponding to the first call.

Optionally, the processor 51 is further configured to: before the terminal detects the acceleration of the terminal, receive a call request sent by the second terminal, and determine the identification information of the second terminal according to the call request; and after it is determined that the blacklist does not include the identification information of the second terminal, detect the acceleration of the terminal, and when a first preset time segment after a call corresponding to the call request is ended is reached, stop detection of the acceleration of the terminal.

Optionally, the processor 51 is further configured to: when it is determined that a communication message, for communication with the second terminal, in a communication application of the terminal is in the foreground, acquire the identification information of the second terminal.

Optionally, the processor 51 is further configured to: after acquiring a communication message selection instruction triggered by the user operation, detect the acceleration of the terminal, and when a second preset time segment after the communication message selection instruction triggered by the user operation is received is reached, stop detection of the acceleration of the terminal.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A blacklist management method, comprising:
receiving, by a first terminal, a call request sent by a second terminal;
determining, by the first terminal, identification information of the second terminal according to the call request;
blocking the call request when a blacklist of the first terminal includes the identification information of the second terminal;
detecting, by an acceleration sensor of a first terminal, an acceleration of the first terminal when the blacklist of the first terminal does not include the identification information of the second terminal; and
adding, by the first terminal, the identification information of the second terminal to the blacklist of the first terminal when the acceleration of the first terminal is greater than or equal to a first preset value.

2. The method of claim 1, wherein acquiring the identification information comprises acquiring the identification information of the second terminal when the first terminal is in a call with the second terminal, and wherein the method further comprises terminating the call before adding the identification information to the blacklist.

3. The method of claim 1, wherein before acquiring the identification information, the method further comprises:
determining a first call, whose call end time point is closest to a current time point, among all calls of the first terminal when the first terminal is not in a call; and
determining a first time segment according to the call end time point and the current time point, wherein acquiring the identification information comprises acquiring the identification information when the first time segment is less than or equal to a second preset value.

4. The method of claim 1, wherein acquiring the identification information of the second terminal comprises acquiring the identification information of the second terminal when a communication application of the first terminal, corresponding to a communication message, is in a foreground, wherein the communication message is for communication with the second terminal.

5. The method of claim 4, wherein detecting the acceleration comprises:
detecting the acceleration after a communication message selection instruction triggered by a user operation is acquired; and
stopping detection of the acceleration when reaching a second preset time segment after the communication message selection instruction is acquired.

6. A first terminal comprising:
a memory storing a computer executable instruction; and
a processor coupled to the memory by using a communications bus and configured to:
receive a call request sent by a second terminal;
determine identification information of the second terminal according to the call request;
block the call request when a blacklist of the first terminal includes the identification information of the second terminal;
detect an acceleration of the first terminal using an acceleration sensor when the first terminal is running and the blacklist of the first terminal does not include the identification information of the second terminal; and
add the identification information of the second terminal to the blacklist of the first terminal when the acceleration of the first terminal is greater than or equal to a first preset value.

7. The first terminal of claim 6, wherein the processor is further configured to:
acquire the identification information when the first terminal is in a call with the second terminal; and
terminate the call before adding the identification information to the blacklist.

8. The first terminal of claim 6, wherein before acquiring the identification information of the second terminal, the processor is further configured to:
determine a first call, whose call end time point is closest to a current time point, among all calls of the first terminal when the first terminal is not in a call;
determine a first time segment according to the call end time point and the current time point; and
acquire the identification information when the first time segment is less than or equal to a second preset value.

9. The first terminal of claim 6, wherein, before detecting the acceleration of the first terminal, the processor is further configured to
stop detection of the acceleration when a first preset time segment after an end of a call corresponding to the call request is reached.

10. The first terminal of claim 6, wherein the processor is further configured to acquire the identification information when a communication application of the first terminal, corresponding to a communication message, is in a foreground, wherein the communication message is for communication with the second terminal.

11. The first terminal of claim 10, wherein the processor is further configured to:
acquire a communication message selection instruction triggered by a user operation;
detect the acceleration of the first terminal after acquiring the communication message selection instruction; and
stop detection of the acceleration when reaching a second preset time segment after the communication message selection instruction is acquired.

12. The method of claim 1, wherein the method further comprises stopping the detecting the acceleration when a first preset time segment after an end of a call corresponding to the call request is reached.

13. The method of claim 3, wherein determining the first call among all calls of the first terminal further comprises determining the first call among all calls of the first terminal when a communication application of the first terminal, corresponding to the first call, is in a background.

14. A blacklist management method, comprising:
receiving, by a first terminal, a message from a second message;
displaying the message;
detecting, by an acceleration sensor of the first terminal, an acceleration of the first terminal;
acquiring identification information of a second terminal when the acceleration is greater than or equal to a first preset value; and
adding the identification information of the second terminal to a blacklist of the first terminal when the acceleration of the first terminal is greater than or equal to the first preset value.

15. The method of claim 14, wherein detecting the acceleration of the first terminal comprises detecting the acceleration when the blacklist does not comprise the identification information of the second terminal.

16. The method of claim 14, wherein displaying the message comprises displaying the message in a message list.

17. The method of claim 16, wherein before detecting the acceleration of the first terminal, the method further comprises:

acquiring an operation; and selecting the message in response to the operation.

18. The method of claim 14, further comprising deleting the message.

\* \* \* \* \*